March 23, 1954
O. J. HABER
2,672,647
FEEDER FOR FISH CUTTING MACHINES
Filed April 25, 1952
5 Sheets-Sheet 1
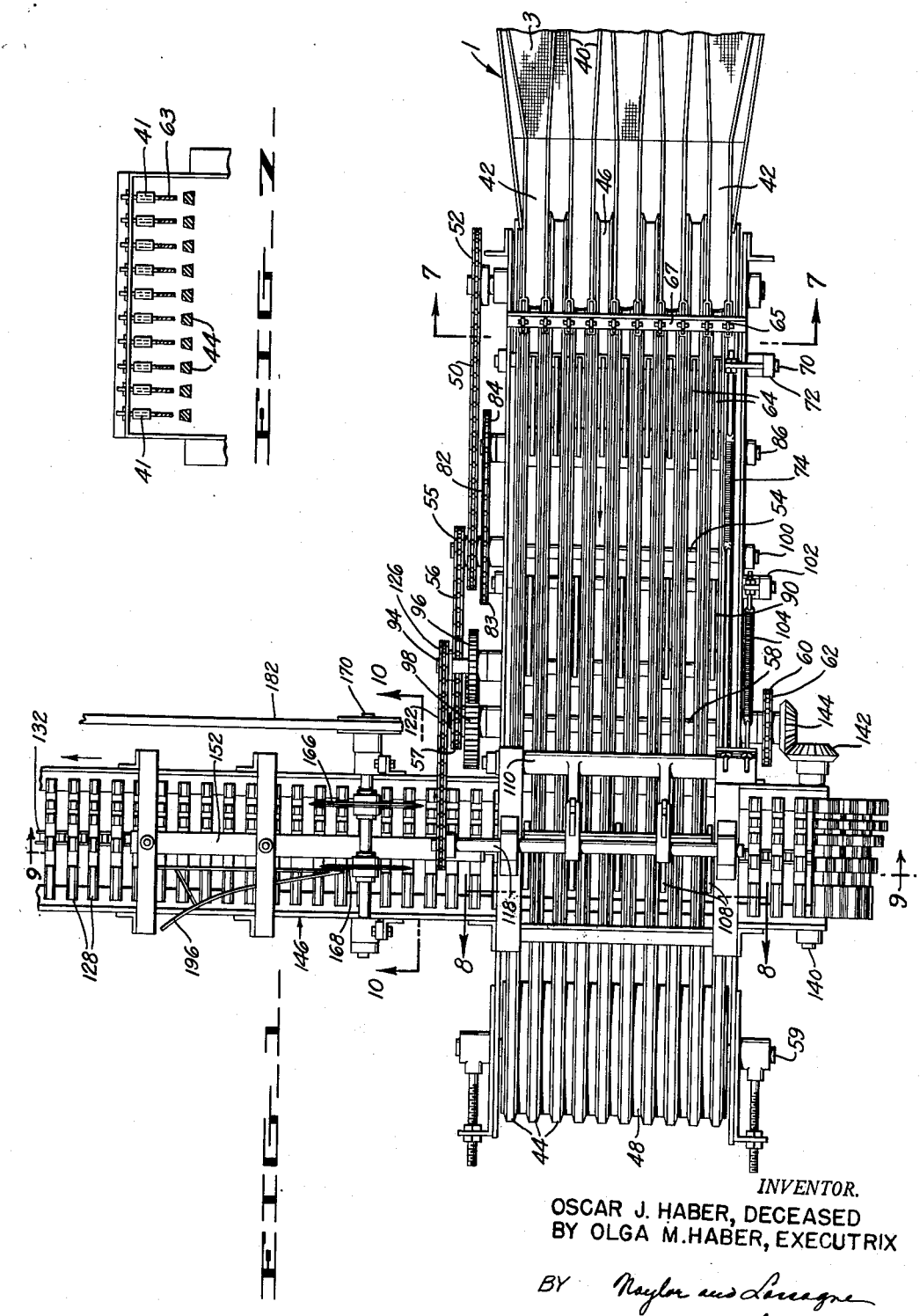
INVENTOR.
OSCAR J. HABER, DECEASED
BY OLGA M. HABER, EXECUTRIX
BY *Naylor and Lonergan*
ATTORNEYS

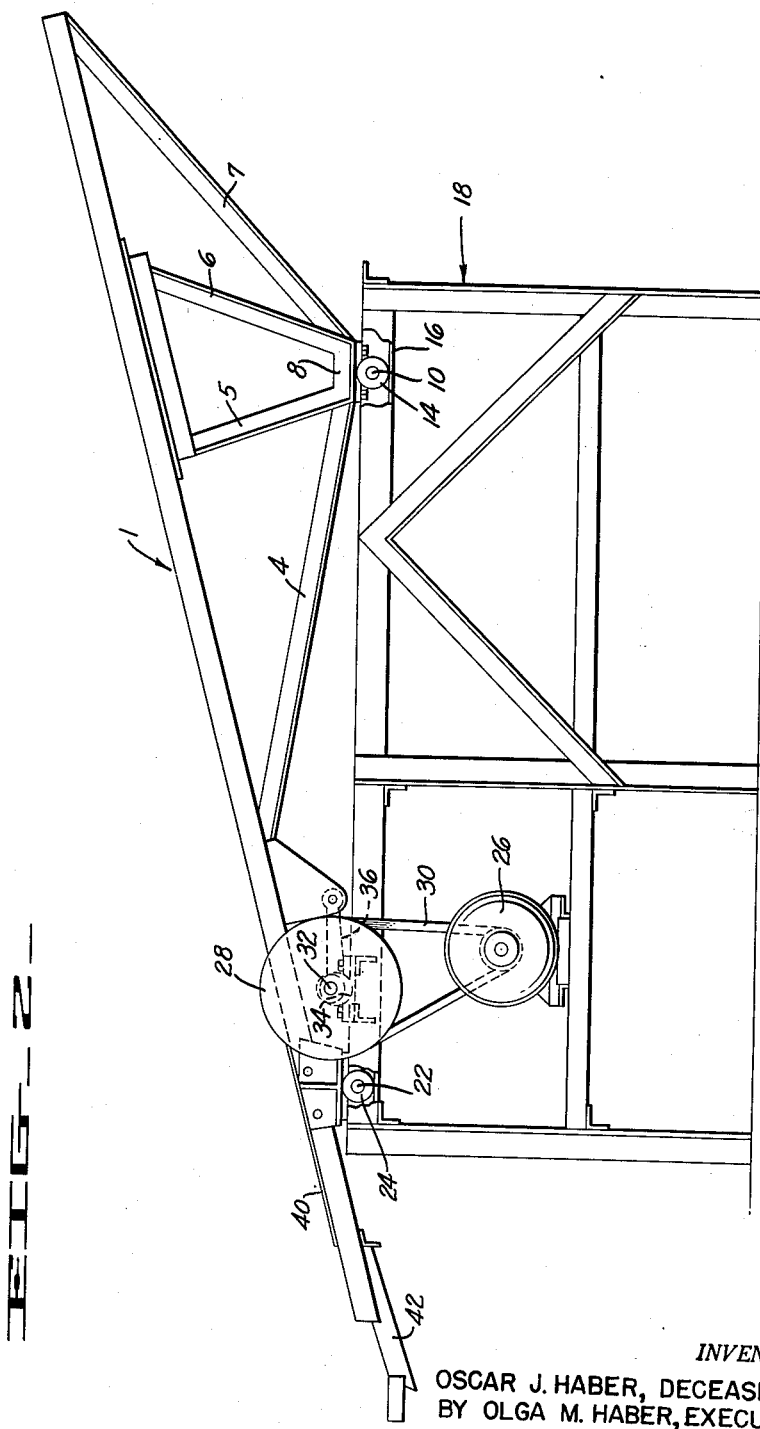

March 23, 1954 O. J. HABER 2,672,647
FEEDER FOR FISH CUTTING MACHINES
Filed April 25, 1952 5 Sheets-Sheet 3
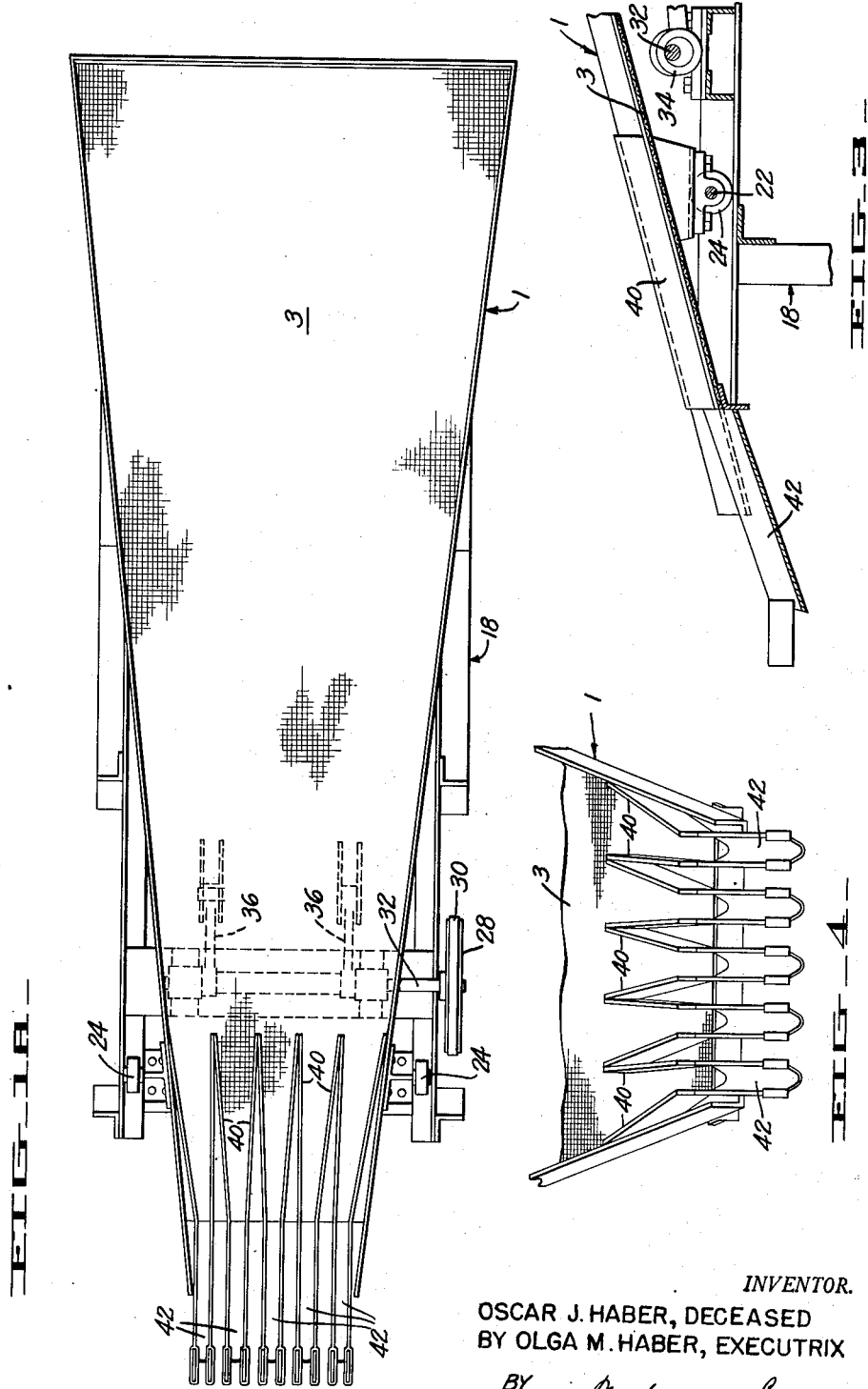
INVENTOR.
OSCAR J. HABER, DECEASED
BY OLGA M. HABER, EXECUTRIX
BY Naylor and Larraque
ATTORNEYS

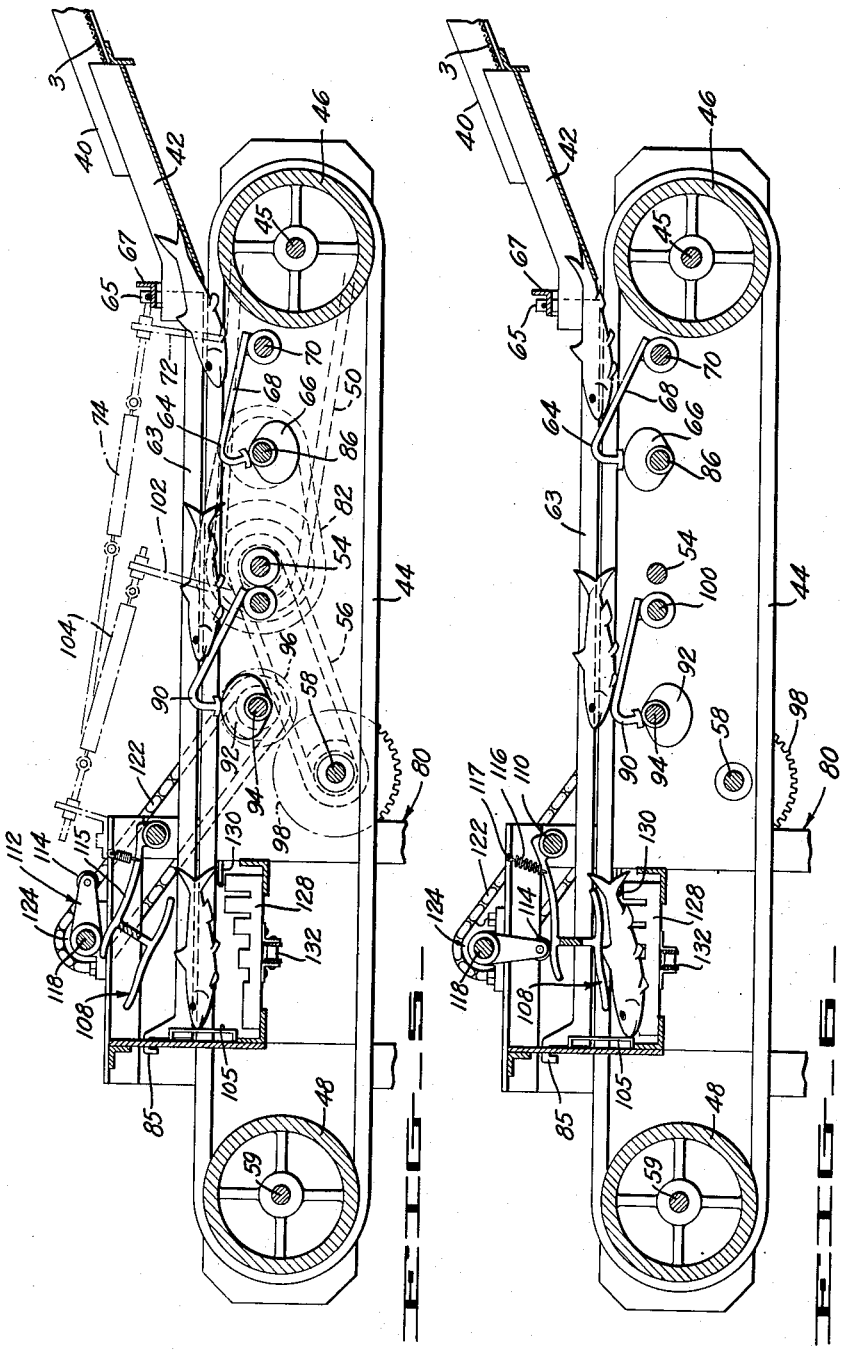

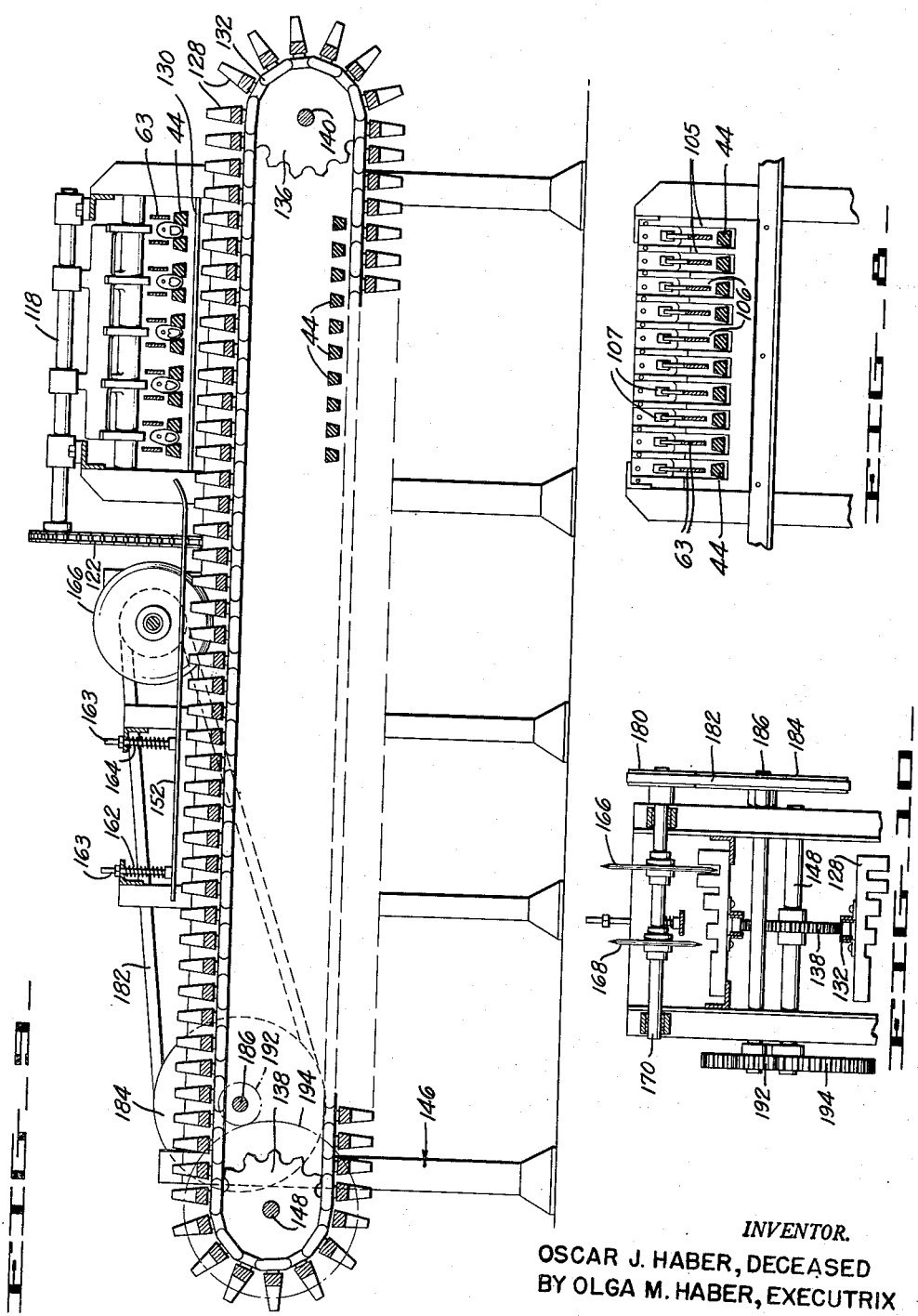

Patented Mar. 23, 1954

2,672,647

UNITED STATES PATENT OFFICE 2,672,647

FEEDER FOR FISH CUTTING MACHINES

Oscar J. Haber, deceased, late of San Francisco, Calif., by Olga M. Haber, executrix, San Francisco, Calif.

Application April 25, 1952, Serial No. 284,371

17 Claims. (Cl. 17—2)

The present invention relates to improvements in fish cutting and eviscerating machinery, and more particularly to feeding mechanism for such machines, and is a continuation-in-part of Haber application Serial No. 729,337, filed February 18, 1947, now abandoned.

Fish cutting and eviscerating machines in which a conveyor comprising series of pockets formed between cutting blocks carry fish to various types of cutting and eviscerating devices are well known. The automatization of the function of supplying fish to the pockets of the conveyors of such machines has, however, presented a serious problem because of the necessity for orienting the fish in such pockets with their heads disposed in the same direction and in a "belly down" position.

The feeding mechanism of the present invention accomplishes this orientation automatically. It is adapted, furthermore, to be synchronized with the conveyor of any of a number of standard type of cutting and eviscerating machines so as to effect automatic feeding thereof.

The machine of the present invention employs a known type of shaker table for orienting the fish with their heads disposed in the same direction. Combined therewith is a novel orienting device which receives fish from the shaker table and orients them in a "belly down" position. From this orienting device the fish are transferred to the conventional pockets of a cutting machine conveyor by a novel mechanism which is synchronized with said conveyor, and which by grouping the fish for transfer to the conveyor of the cutting machine makes it possible for the latter to run continuously and at a considerably greater speed than does the feeder.

The novel features of the invention are defined with particularity in the appended claims. The invention itself will be best understood, however, from the following description of a preferred embodiment thereof illustrated in the accompanying drawings in which:

Figures 1 and 1a are two parts, on different scales, of a plan view of a feeding mechanism embodying the present invention, connected in synchronized relationship with a conventional type of cutting machine;

Figure 2 is a view in side elevation of the fish orienting system of the feeding mechanism shown in Figure 1a;

Figure 3 is a detail view in section of the forward end of the orienting system of Figure 2;

Figure 4 is a view in front elevation of that portion of the feeding mechanism shown in Figure 3;

Figure 5 is a view in longitudinal medial section of the fish aligning and conveying system of the feeding mechanism of Figure 1, showing the relative positions of the checker and ejector means in one phase of operation;

Figure 6 is a view similar to that of Figure 5, but showing the relative positions of the checker and ejector means in another phase of operation;

Figure 7 is a detail view in section taken along lines 7—7 of Figure 1 and showing the fish guide and conveying means of the mechanism;

Figure 8 is a detail view in section taken along lines 8—8 of Figure 1 and showing the fish stop means and the discharge end of the fish guide means of the invention;

Figure 9 is a view in section taken along lines 9—9 of Figure 1; and

Figure 10 is a detail view taken along lines 10—10 of Figure 1.

In the preferred embodiment, the feeding mechanism utilizes a conventional shaker structure of the kind disclosed in the patent to Mullins, 1,893,903, dated January 10, 1933, for orienting fish so that their heads are disposed in the same direction. As illustrated, this shaker structure comprises an inclined table 1 having a wire mesh screen surface 3. Fish are loaded on the table by any desired means, such as a chute leading from a storage tank, whereby the amount of fish discharged onto the table may be controlled. The table 1, which is inclined at an angle of approximately 15 degrees from the horizontal, is supported at one end by a plurality of fixed support members 4, 5, 6, 7 and 8 which have a common connection with a shaft 10. The shaft 10 is provided with rollers 14 which are adapted to travel on rails 16 forming the upper part of the supporting framework 18 of the table. At its lower end, the table has connected therewith a shaft 22 having rollers 24 adapted to travel on the rails 16.

The table is shaken by the following drive mechanism: motor 26 drives sheave 28 by means of a belt 30; shaft 32 mounted on frame 18 is rotated by sheave 28; and a pair of eccentrics 34 mounted on shaft 32 impart a longitudinally reciprocating motion to arms 36 which are pivotally attached at their outer ends to the table. In practice, the shaft 32 is rotated at a speed of approximately 300 R. P. M., thus causing the table 1 to vibrate rapidly in a longitudinal direction.

According to the present invention, means are provided in combination with the described shaker structure for orienting the fish in "belly down" position. In the preferred embodiment of the invention, the orienting means comprise spaced pairs 40 of converging guide fins secured to the forward end of the screen bed of the table and a plurality of spaced elongated belly cups 42 secured in fish receiving relation to the pairs of guide fins 40. Preferably, the belly cups are so disposed with respect to the shaker table surface that the fish drop a short distance, for example, three-quarters of an inch, in moving from the lower end of the shaker table into the belly cups.

As the fish move down the table toward the guide fins 40, the rapid vibrating action of the shaker table together with the gravitational force applied to the fish causes the fore parts of the fish, which are heavier than the tail portions, to approach the fins 40 in a head first manner. The pairs of guide fins 40 then act as channels into which the fish are permitted to enter only one at a time. As the fish pass between the pairs of fins, they are gradually forced to straighten up slightly by reason of the convergence of the channels defined by the guide fin pairs, and this straightening up operation is finally completed by causing the fish to drop the short distance from the table into the belly cups, wherein the dorsal portions of the fish are in an upright position by virtue of the drop and the action of gravity on the heads and bellies, the heavier portions of the fish.

It should be pointed out that while the shaker table orienting portion of the system operates in the manner described, random and infrequent occasions will arise, particularly if the machine is allowed to operate for a fairly long period of time without the attendance of an operator, when a fish will be oriented sidewise with respect to the mouth of a guide channel, thus blocking that channel, despite the fact that the rapid throw to and fro of the table tends to prevent this. With a minor amount of supervisory attention on the part of an operator, this situation can be readily cured by a manual re-orientation of an obstructing fish.

As the fish are discharged from the belly cups 42, they are deposited onto continuous cradle-type supports comprised of pairs of inverted and truncated resilient V-belts 44 carried by drums 46 and 48. In order to insure that the fish will be maintained in their upright position during transfer from the belly cups to the V-belts, the forward ends of the cups are provided with pairs of guide strips 41. After the fish have been fully deposited upon the V-belts, they will be maintained in their upright position by the form, spacing and uniform rate of travel of the belts. It will be noted that the fish are deposited between alternate pairs of belts rather than between each pair, and this is for a purpose hereinafter described.

The driving system for the conveyor belts 44 comprises a chain 50 (Figure 1) in driving relation to sprocket 52 secured to the axle 45 of drum 46, said chain being driven by sprocket 53 secured to shaft 54. Shaft 54 is driven through sprocket 55 by chain 56 which passes over sprocket 57 secured to shaft 58. A source of power, not shown, drives shaft 58 by means of chain 60 in engagement with sprocket 62 secured to the shaft. Drum 58 mounted on axle 59 is the idler drum of the V-belt conveyor. Axles 45 and 59 and shafts 54 and 58 are journalled for rotation on V-belt system support frame 80.

In order to laterally align the fish on the V-belts 44 so that they may move forward in successive laterally aligned, or "company front," groups, a plurality of checkers 64 are provided. The checkers, which are actuated by cam 66 secured to a shaft 86 which is journalled for rotation in frame 80, are carried by member 68 secured to a shaft 70 which is supported for rotation by frame 80. The forward ends of the checkers 64 are maintained against the surfaces of cam 66 by a yieldable connection between member 68 and frame 80 comprising arm 72 and spring 74. Shaft 86 and the cam 66 carried thereby are rotated by a chain 82 which passes over sprocket 83 secured to shaft 54 and sprocket 84 secured to shaft 86.

As the cams 66 are rotated from their lowermost position, as shown in Figure 5, to their uppermost position, as shown in Figure 6, the checkers 64 are moved upwardly against the resistance of spring 74 to extend into the channels defined between adjacent V-belts 44. As the fish in the alternate V-belt channels engage the checkers, the forward movement of the fish is temporarily halted, with the fish being slightly cammed upwardly by the checkers so that relative movement can occur between the fish and V-belts. As the checkers move downwardly under the action of spring 74 as the cam 66 swings toward the position of Figure 5, a company front, or a line, group of fish moves forwardly on the V-belt conveyor.

The fish are then carried by the V-belt conveyor to a second group of checkers 90 which are synchronized with the checker 64 so as to be in their upper position when the fish reach them. The checkers 90 are secured to shaft 100 journalled in frame 80, and the cams 92 are secured to shaft 94 journalled for rotation in frame 80. The cams 92 are driven at the same speed as cams 66 by means of gear wheel 96 secured to shaft 94 and gear wheel 98 which is in mesh with wheel 96 and secured to shaft 58. The checkers 90 are maintained in engagement with the cams 92 by yieldable means connecting shaft 100 to frame 80 comprising rod 102 and spring 104. As the checkers 90 move downwardly under the action of spring 104, the fish move forwardly on the V-belt conveyor until they come into contact with a stop plate 105 carried by frame 80. The plate 105 is provided with openings 106 (Figure 8) through which the belts 44 pass.

The mechanism preferably embodies guide means for the fish to insure that the fish will be maintained in an upright position during their course of travel on the V-belt conveyor. Such means are comprised of a plurality of spaced parallel guide strips 63 disposed above belts 44. The ends 65 of strip 63 are attached to a supporting cross bar 67 carried by frame 80. The guide strips 41 carried by the belly cups 52 are provided with looped ends which fit around the upwardly extending ends 65 of strip 63. The opposite ends 35 of the guide strips 63 are removably anchored with apertures 107 formed in the stop plate 105. Although not necessary to maintain the fish in an upright position during normal travel of normally sized fish on the V-belt conveyor, the guide strips 63 serve to maintain the upright position of larger sized fish which ride higher on the belts 44, and, also, the guide strips maintain the position of the fish when the fish are raised by the checkers 64 and 90.

When the fish engage the stop plate 105, they are positioned directly beneath a plurality of ejectors 108, there being one ejector for each of the alternate fish carrying channels defined by the V-belts 44. The ejectors are carried to a shaft 110 journalled for rotation in frame 80, and they are actuated by a pair of spaced cams 112 secured to shaft 118 journalled on frame 80. Chain 122 passing over sprocket 126 secured to shaft 94 and sprocket 124 secured to shaft 118 causes shaft 118 and cams 112 carried thereby to rotate to cause wheel elements 114 carried by the cams to engage arms 115 connected to the bank of ejectors 108 to move the ejectors downwardly against the action of spring 116 serving to connect the ejector control arms 115 to frame 80 through rod 117.

The cyclic operation of cams 112 is such that the ejectors 108 are simultaneously depressed once for each time the checkers 90 allow a group of fish to proceed on the belts 44, and the ejectors are depressed at substantially the same time the fish are moved into engagement with the stop plate 105. The ejectors, which are shaped to substantially conform to the general contour of the fish, eject the fish from the V-belts 44 by forcing the fish downwardly between the belts. The resilient belts are forcefully spread apart by the pressure of the ejectors against the fish to allow the fish to pass therebetween.

From Figure 5 it will be noted that when the ejectors 108 are moving downwardly to force the fish between belts 44 and thus diverge those belts defining the conveyor cradles for the fish, the checkers 64 are moving to an uppermost position between the belts. The checkers 64, which are shown in Figure 1 as being located between each successive pair of belts, rather than each alternate pair of belts, as is the case with the checkers 90, thus serve to prevent such divergence of the belts in the belt conveyor regions of the two groups of checkers as would allow the fish in these regions of the conveyor to fall through the belts. If desired, the checkers 90 may be disposed between successive pairs of belts to further restrict the divergence of the belts for the stated purpose. It is to be pointed out, however, that it may be desirable for purposes of grading out smaller undesired fish to allow free divergence of the belts throughout the length of the conveyor under the fish ejector action of ejectors 108.

As the fish are forced between the belts 44, they are received within support cradles defined between spaced adjacent cutting blocks 128 of a conventional fish-cutting machine. The blocks 128 are secured to a chain drive 132 passing over sprocket wheel 136 secured to shaft 140 journalled for rotation in frame 80 and sprocket wheel 138 secured to shaft 148 journalled for rotation in the frame 146 of the cutting machine. The block conveyor drive shaft 140 is driven by engagement of beveled gear 142 carried thereby with beveled gear 144 secured to shaft 58. The block conveyor is thus driven in timed relation with the V-belt conveyor, with the timed relationship being such that when a group of fish is ejected from the V-belt conveyor the fish are received in alternate cradles defined by the cutting blocks 128. A fish tail guide bar 130 disposed below the belts 44 and extending for the width of the frame 80 to which it is secured serves to support the tails of the fish out of the cutting block cradles until the fish pass from beneath the belts 44.

As the fish are moved by the cutting block conveyor, they pass under bar 152 which is yieldingly mounted on frame 146 by means of support rods 160 and compression springs 162 and 164. The bar 152, which is yieldingly movable in a vertical direction to accommodate fish of varying size, serves to firmly position the fish in an upright position for the cutting and eviscerating operation. The moving fish are engaged by a pair of rotating circular knives 166 and 168, the former serving to sever the tails of the fish and the latter serving to partially sever the heads of the fish at points in back of the gills. The knives are mounted on shaft 170 journalled for rotation in members of the frame 146. Shaft 170 is provided with a sheave 180 which is driven by belt 182, said belt being in turn driven by sheave 184 mounted on shaft 186 journalled for rotation in elements of frame 146. Shaft 186 is provided with a gear wheel 192 which is driven by gear wheel 194 secured to the idler shaft 148 of the block conveyor.

The cutting machine, which is of a conventional type, as above mentioned, is provided with an eviscerating bar 196 attached to the frame 146. The pointed rearward end of the bar 196 is so disposed as to enter the partial cuts in the fish caused by knife 168, and the heads of the fish are cammed outwardly by travel along the cam shaped outer side of the bar, thus causing the heads and viscera to be pulled free of the fish bodies. The heads and viscera gravitate over the side of frame 146 into any suitable receptacle, while the severed tails of the fish remain in the cutting blocks until they are delivered by the conveyor into a receiving receptacle which is separate and apart from the means utilized to receive the fish bodies.

While a specific and preferred embodiment of the invention has been shown and described, it is to be understood that all substantial equivalents of said embodiments are within the spirit and scope of the invention.

What is claimed is:

1. A fish feeder mechanism for delivering groups of laterally aligned and positionally oriented fish to a block type conveyor of a fish cutting machine comprising a closed path feed conveyor having an input end and a discharge end, said discharge end extending over and beneath the upper reach of said block type conveyor and at a right angle thereto, said feed conveyor being comprised of a plurality of spaced resilient belts defining between adjacent belts a plurality of longitudinally extending open-bottomed conveyor channels, fish orienting and feeding means disposed adjacent the input end of said feed conveyor and adapted to feed fish into alternate channels of said feed conveyor in a head-first and belly-down position, means for laterally aligning the fish fed onto said conveyor by said orienting and feeding means comprising laterally aligned checker elements cyclically operable in unison to move upwardly between said belts to block the movement of the fish and to move downwardly to release said fish for further movement by said feed conveyor, and means to transfer the groups of aligned fish from said feed conveyor to the conveyor of said cutting machine comprising laterally aligned ejector elements disposed above said conveyors and cyclically operable in unison in timed relation with the movement of said checker elements and said block type conveyor to move downwardly and force a group of fish between said belts and onto said block type conveyor.

2. A fish feeder mechanism comprising a plurality of spaced parallel resilient belts defining between adjacent belts a plurality of longitudinally extending open-bottomed channels, fish orienting and feeding means disposed in delivery relation with alternate ones of said belt defined channels, checker means associated with said alternate channels and disposed in spaced relation with said orienting and feeding means in the direction of travel of said belts, said checker means being operable in one position of operation to block the movement of fish in said alternate channels and operable in another position of operation to release said fish for travel with said belts, ejector means associated with said alternate channels and disposed above said belts and in spaced relation with said checker means in the direction of travel of said belts, said ejector means being operable to move downwardly within said alternate channels, and means operable to drive said belts, checker means and ejector means in timed relation.

3. Fish feeder mechanism comprising a pair of spaced parallel resilient belts defining an open-bottomed fish supporting cradle, drive means for said belts, ejector means disposed above and between said belts operable to move downwardly to apply a sufficient force to a fish supported longitudinally between said belts to spread said belts apart and cause the fish to drop beneath said belts.

4. In combination, the feeder mechanism set forth in claim 3, a block type conveyor of a fish cutting machine extending beneath said belts and ejector means and normal thereto, and means to drive said ejector means and said block type conveyor in timed relation.

5. Fish feeder mechanism comprising a pair of spaced parallel resilient belts defining an open-bottomed cradle adapted for the lengthwise support of fish, ejector means associated with said belts cyclically operable to move in one direction to force a fish through said belt-defined cradle and to move in the opposite direction out of the path of travel of other belt supported fish, checker means associated with said belts in spaced relation with said ejector means cyclically operable to move in one direction between said belts to intercept and check the movement of a fish on said belts and to move in the opposite direction to release said fish for movement toward said ejector means, and drive means to synchronize movement of said belts, checker means, and ejector means, whereby a fish released by said checker means will be brought beneath said ejector means as said latter means is moved in said one direction to eject a fish from said belts.

6. In combination, the feeder mechanism set forth in claim 5, a block type conveyor of a fish cutting machine extending beneath said belts and ejector means and normal thereto, and drive means for said conveyor operable to synchronize the movement thereof with the movement of said ejector means, whereby a fish ejected from said belts will be deposited within a block of said conveyor.

7. Fish feeder mechanism comprising a pair of spaced parallel resilient belts defining an open-bottomed cradle adapted for the lengthwise support of fish, fish orienting and feed means in delivery relation with said cradle adapted to feed fish into said cradle in a head first and belly down position, ejector means disposed in spaced relation to said orienting and feed means and associated with said belts, said ejector means being cyclically operable to move in one direction to force a fish through said belt-defined cradle and to move in the opposite direction out of the path of travel of other belt supported fish, checker means disposed between said orienting and feed means and said ejector means and associated with said belts, said checker means being cyclically operable to move in one direction between said belts to intercept and check the movement of a fish on said belts and to move in the opposite direction to release said fish for movement toward said ejector means, and drive means to synchronize movement of said belts, checker means, and ejector means, whereby a fish released by said checker means will be brought beneath said ejector means as said latter means is moved in said one direction to eject a fish from said belts.

8. In combination, the feeder mechanism set forth in claim 7, a block type conveyor of a fish cutting machine extending beneath said belts and ejector means and normal thereto, and drive means for said conveyor operable to synchronize the movement thereof with the movement of said ejector means, whereby a fish ejected from said belts will be deposited within a block of said conveyor.

9. In a machine of the class described, an inclined longitudinally vibrating table, means disposed at the lower end of said table for positioning fish belly down and head first, a first conveyor cooperating with said fish positioning means for carrying fish longitudinally, cyclically operable means for checking such longitudinal travel of fish, cyclically operable means for ejecting fish from the first conveyor, a second conveyor positioned beneath the first conveyor to receive and carry transversely ejected fish, means extending the width of first conveyor for holding fish tails above second conveyor, and a common means for synchronously operating said conveyors, said checking means and said ejecting means.

10. In a machine of the class described, an inclined table actuated to vibrate longitudinally and having belly-cups attached to the lower end thereof, a first conveyor adjacent to the belly-cups positioned to receive fish therefrom and to carry fish longitudinally, two sets of checkers for momentarily checking the travel of fish, ejectors for ejecting fish from the first conveyor, a second conveyor for carrying fish transversely positioned beneath the first conveyor to receive fish as ejected, means for synchronizing the operating of said conveyors, said checkers and said ejectors, and a tail guide bar extending the width of the first conveyor for holding tails of fish above the second conveyor.

11. In a machine of the class described, a longitudinally vibrating inclined table having inclined belly-cups attached at the lower end positioned a short distance below the table, a first conveyor adjacent to the belly-cups and adapted to receive fish gravitating therefrom; said conveyor having a plurality of belts for carrying fish longitudinally, a plurality of guides above the belts and extending the length of the travel of the fish, two sets of checkers for momentarily stopping, lining up, and releasing fish, means for synchronizing said checkers so that fish released from the first set of checkers are momentarily stopped by the second set of checkers, ejectors adapted to thrust fish through the belts, means for synchronizing said ejectors with said checkers so that fish released from said second set of checkers are thereafter ejected downwardly between the belts of said conveyor, a second conveyor positioned beneath the first conveyor for carrying fish transversely and to receive fish ejected through the belts and a tail guide bar positioned above and extending the width of the first conveyor adapted to hold the fish tails above the second conveyor.

12. In a machine of the class described, an inclined longitudinally vibrating table having inclined belly-cups attached at the lower end for positioning fish head first and belly down, a conveyor adjacent to the belly-cups and comprising a plurality of conveyor belts for carrying fish longitudinally as they gravitate out of said belly-cups, a plurality of guides above the belts and extending the length of the travel of the fish, two synchronized sets of checkers for momentarily checking the travel of fish, ejectors synchronized with the checkers for ejecting fish downwardly between the conveyor belts, a cutting-block conveyor positioned adjacent one end of the belt conveyor and synchronized with the ejectors and carrying a plurality of cutting blocks positioned below the conveyor belts to receive and carry ejected fish transversely, and a tail guide bar positioned below and extending the width of the conveyor belts for holding tails of fish above the cutting blocks.

13. In a machine of the class described, an inclined longitudinally vibrating table having fish guides at the lower section thereof leading into inclined belly-cups attached to and positioned below the level of the lower end of the table, and a conveyor comprising spaced belts disposed adjacent to the belly-cups for receiving fish gravitating from the belly-cups and carrying them longitudinally in the orientation in which they gravitate from said belly-cups.

14. In a machine of the class described, a multiple spaced-belt conveyor for longitudinally carrying fish positioned between said belts, ejectors for pushing fish downwardly between the belts, and a pocket conveyor mounted beneath the ejectors, at right angles to and below the belt conveyor, and means for synchronizing the said conveyors and said ejectors.

15. In a machine of the class described, a multiple spaced-belt conveyor for carrying fish between said belts, means for ejecting fish downwardly between the belts of said conveyor, a pocket conveyor beneath, at right angles to, the belt conveyor for carrying fish horizontally, means for driving said conveyors and said ejecting means in timed relationships, and a tail guide bar extending the width of the multiple belt conveyor for holding fish tails above the pocket conveyor.

16. In a machine of the class described, a multiple belt conveyor for longitudinally carrying fish positioned belly down and head first, two sets of checkers disposed between the belts for momentarily checking the travel of the fish, ejectors for pushing fish between the belts, a pocket conveyor mounted below the ejectors and at right angles to and beneath the belt conveyor and a common driving means synchronizing said conveyors, said checkers, and said ejectors so that fish released by said first set of checkers are checked by said second set of checkers, and those released by said second set of checkers are ejected by said ejectors into pockets of said pocket conveyor.

17. A conveyor for fish comprising a pair of spaced parallel resilient belts, said belts being continuous and having an inverted V-form in cross section to define therebetween an open-bottom cradle adapted for the lengthwise support of fish, grooved driver and idler drums for said belts adapted to anchor the terminal ends of said belts against lateral displacement, driving means connected to said driver drum, and fish ejector means movably mounted above said open-bottom cradle and operable to force fish downwardly through said cradle.

OLGA M. HABER,
*Executrix of the last will and testament of Oscar J. Haber, deceased.*

References Cited in the file of this patent

UNITED STATES PATENTS

| Number | Name | Date |
|---|---|---|
| 1,568,594 | Flint | Jan. 5, 1926 |
| 1,653,906 | Heinbockel et al. | Dec. 27, 1927 |
| 2,210,234 | Durand | Aug. 6, 1940 |
| 2,297,296 | Flintjer | Sept. 29, 1942 |
| 2,455,175 | Hohl | Nov. 30, 1948 |
| 2,599,694 | Christiansen | June 10, 1952 |